Sept. 8, 1953　　　　　O. R. SCHOENROCK　　　　　2,651,215
NONTORQUE-EQUALIZING DIFFERENTIAL TRANSMISSION
Filed March 3, 1951　　　　　　　　　　　　3 Sheets-Sheet 1
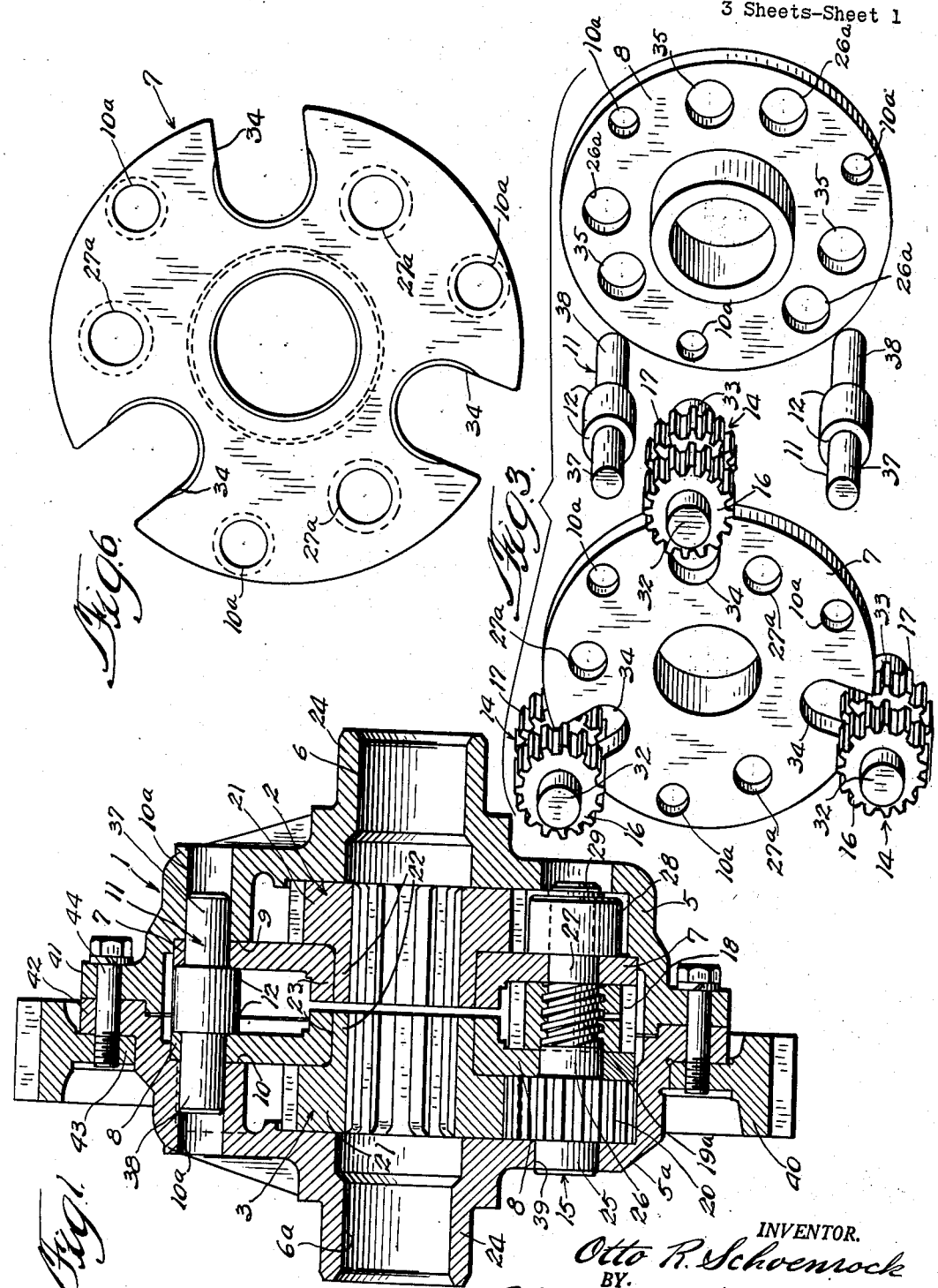
INVENTOR.
Otto R. Schoenrock
BY
Thiess, Olsen & Mecklenburger
Attys.

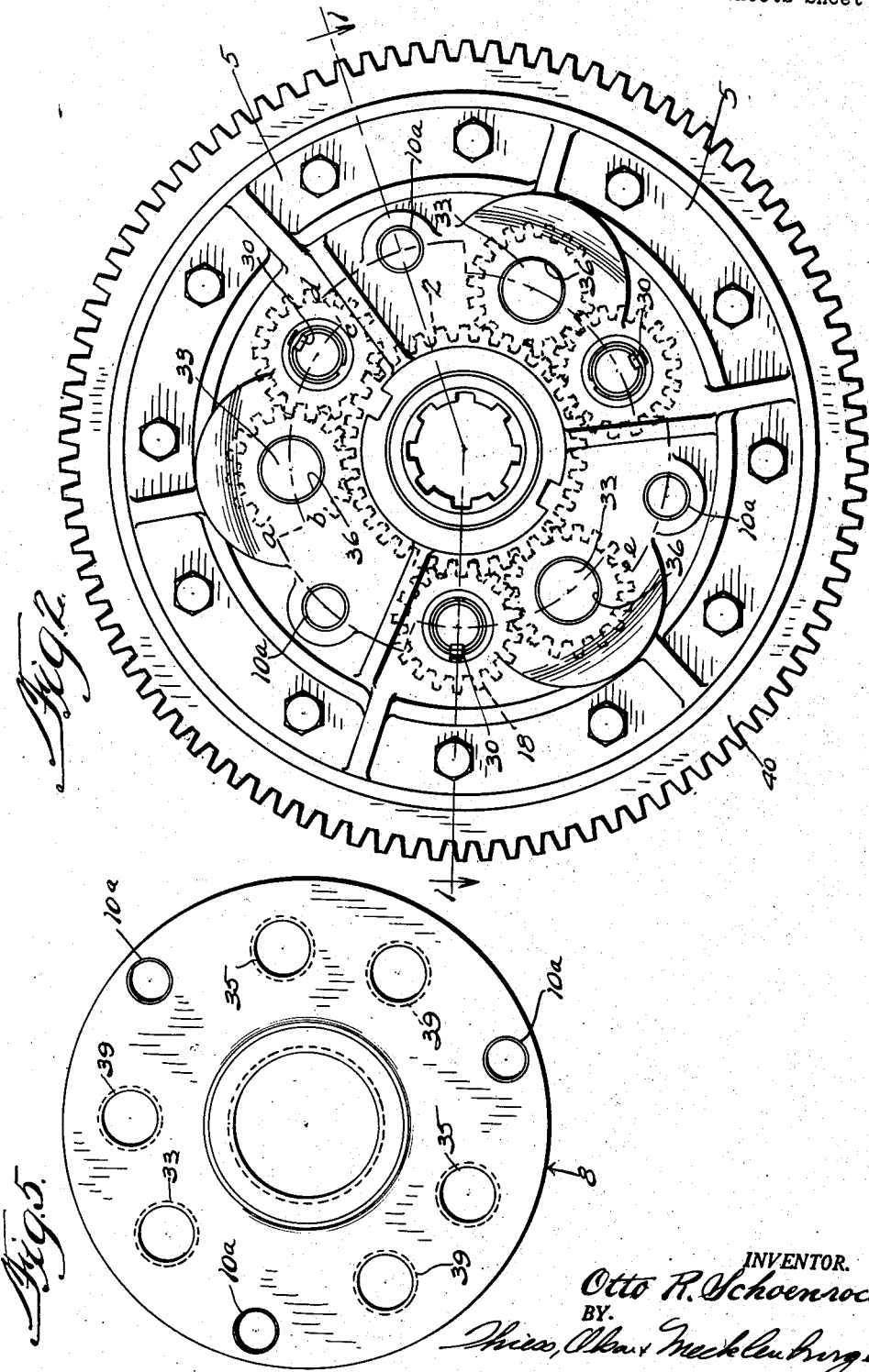

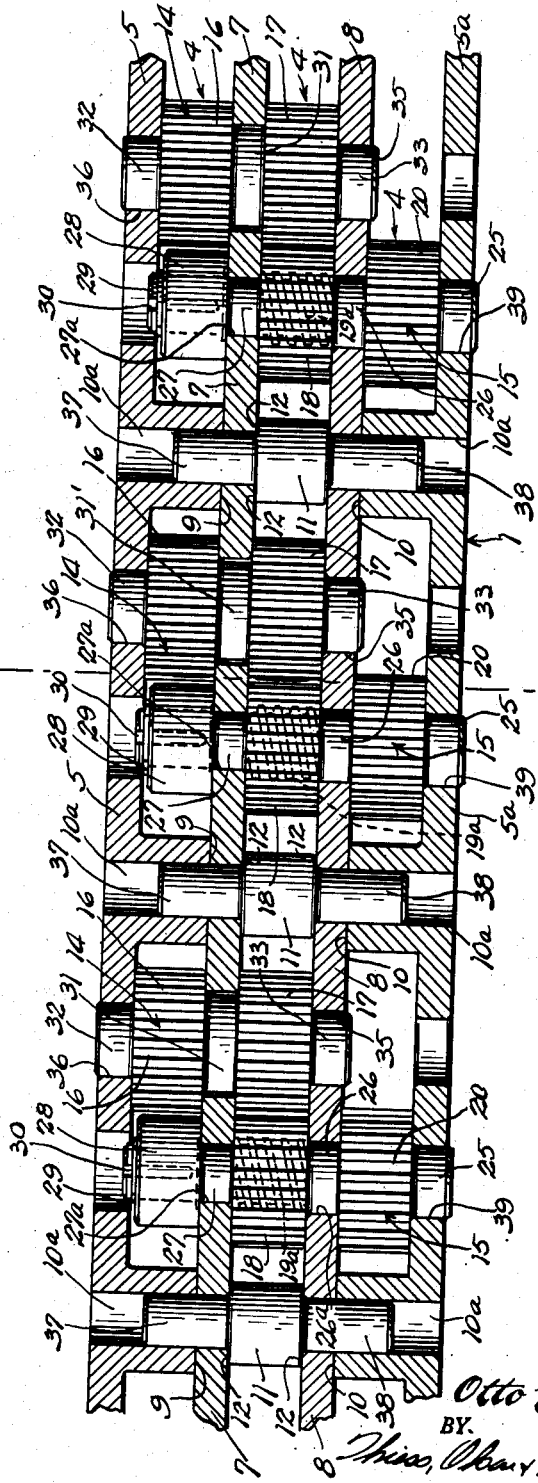

Patented Sept. 8, 1953

2,651,215

UNITED STATES PATENT OFFICE 2,651,215

NONTORQUE-EQUALIZING DIFFERENTIAL TRANSMISSION

Otto R. Schoenrock, Oak Park, Ill., assignor to Dualoc Engineering Co., Rockford, Ill., a corporation of Illinois Application March 3, 1951, Serial No. 213,788

2 Claims. (Cl. 74—711)

My invention relates to non-torque-equalizing differential transmissions.

One of the objects of my invention is to provide a non-torque-equalizing differential transmission which will be compact and rugged in construction, efficient in operation, durable in use and relatively inexpensive to manufacture.

A further object is to provide such a construction using simple spur gear transmission elements and simple screw threaded constructions for the locking action.

A further object is to provide a construction having improved means for holding the component parts in alignment and in the desired relative position.

Further objects and advantages of the invention will be apparent from the description and claims.

In the drawings, in which an embodiment of my invention is shown,

Figure 1 is an axial section, substantially on the line 1—1 of Fig. 2;

Fig. 2 is an end view of the construction shown in Figure 1, viewed from the right;

Fig. 3 is an exploded perspective view showing the drive plates, some of the planet gearing, and the positioning pins for the drive plates and housing;

Fig. 4 is a distorted or flattened out sectional view on the staggered arcuate section line a, b, c, d, e of Fig. 2;

Fig. 5 is a face view of one of the drive plates, and

Fig. 6 is a face view of the other drive plate.

Referring to the drawings in detail, the construction shown comprises a non-torque-equalizing transmission comprising a firmly united rotatable combined gear carrier and housing 1 (Fig. 1), a pair of gears 2 and 3 rotatably mounted in said housing and housed thereby and coaxial therewith, and a non-torque-equalizing transmission 4 (Fig. 4) between said gears mounted in said housing and housed thereby. The housing comprises two cup-shaped members 5 and 5a mounted face to face to form an outer housing. Each cup-shaped member has a central opening 6 and 6a for an element (not shown) rotatable with one of the pair of gears 2 and 3. The gear carrier comprises a pair of bearing and drive members 7 and 8 firmly united with the cup-shaped housing members 5 and 5a, respectively, each having bearing means for the pair of gears, respectively. Each cup-shaped member 5 and 5a has a plurality of face portions 9 and 10, respectively, for engagement with a face of the drive members 7 and 8. The pair of cup-shaped members 5 and 5a and the pair of drive members 7 and 8 have openings 10a in alignment with each other. Positioning pins 11 extend into these openings for aligning the cup-shaped members 5 and 5a and the drive members 7 and 8. These pins 11 have shoulder portions 12 lying between the drive members 7 and 8 for engagement therewith for holding them properly spaced axially. The non-torque-equalizing transmission comprises three sets of gears (Fig. 4). Each set comprises a pair of double gear elements 14 and 15, one gear 16 of one double gear element 14 meshes with one of said coaxial gears 2 and the other, 17, meshes with one of the gears 18 of the other double gear element 15. The other gear 20 of the other double gear element 15 meshes with the other coaxial gear 3. One gear 18 of said other double gear element 15 is internally threaded to receive an externally threaded extension 19a of the other gear 20 of this double gear element 15.

The gears 2 and 3 may be substantially identical. Each comprises a gear tooth portion 21 and a hub 22 extending laterally therefrom. This hub 22 is splined inside to receive the correspondingly splined end of the driven member inserted therein. The outer surface of the hub forms a journal member rotatably mounted in the hub portion 23 of one or the other of the driving plates 7 or 8. The gear portion 21 is held against axial movement between one or the other of the cup-shaped members 5 or 5a and one or the other of the drive plates 7 or 8. The hublike portions 24 of the cup-shaped members 5 and 5a may serve as bearings for the rotatable members, such, for example, as axles (not shown) splined to gears 2 and 3.

The gear 20 of each double gear element 15 is provided with an extension 25 journaled in a bearing opening in the cup-shaped housing member 5a. The gear 20 is further supported by its extension 19a which has a journal portion 26 which extends through a bearing opening 26a in the drive plate 8 and a journal portion 27 which extends through a bearing opening 27a in the drive plate 7. The extension 19 is held against axial movement by means of a collar 28 secured and surrounding the end of the extension 19. This collar 28 is secured in place by means of a split ring 29 sprung into an annular groove in the end of the extension 19. The collar is held against rotation on the extension by means of a key 30 fitted into keyways in the collar 28 and extension 19a. The gears 16 and 17 of the double gear 14 may be formed integral with each other and united by a hublike portion 31. This double gear is rotatably mounted in the cuplike member 5 and in the drive plate 8. For this purpose it is provided with the axial journal portions 32 and 33 extending laterally therefrom which may be integral with the gear portion, which journal portions 32 and 33 are rotatably mounted in bearing openings in the cuplike member 5 and the drive plate 8, respectively.

In assembling the double gear members 14 and 15 with respect to the drive plates 7 and 8, the double gear members 14 are brought to the position shown in Fig. 3 and are then moved radially inwardly with respect to the plates, causing the reduced necks 31 to enter the open-ended radially extending recesses 34 in the plate 7 (Figs. 3 and 6), until the journal extensions 32 and 33 will be in position to engage with the bearing openings 35 and 36 in the drive plate 8 and the cuplike member 5, respectively. The reduced portions 37 of the positioning pins 11 are inserted into the openings 10a in the drive plate 7. The drive plate 8 is then brought into position adjacent and opposite the drive plate 7, with the pin openings 10a in alignment with the reduced ends 38 of the pins 11, and with the bearing openings 39 in alignment with the journal extensions 25 of the double gear elements 15.

Before placing the cup-shaped housing members 5 and 5a in position in the assembly, the double gear elements 15 are assembled on the drive plates 7 and 8. To do this, each gear 18 is positioned between the drive plates 7 and 8 with its threaded opening in alignment with a bearing opening 26a in the plate 8, and the threaded extension 19 of the gear 20 is inserted through the bearing opening 26a in the plate 8 and threaded into the nutlike gear 18. This screwing in of the threaded extension 19a causes the journal portion 26 to enter the bearing opening 26a on the plate 8 and causes the reduced journal portion 27 of the extension to enter the bearing opening 27a in the drive plate 7. The driving plates 8 and 7 are then moved toward each other to cause the extensions 38 of the positioning pins to enter the positioning holes 10a in the plate 8 and to cause the journal extensions 33 of the double gear elements 14 to enter the bearing openings 35 in the drive plate 8. The extension 19a is then secured against axial movement by slipping the collar 28 over the end of the extension 19a and securing it in place by springing the split washerlike ring 29 into the groove at the end of the extension and inserting the key 30.

To assemble the cuplike member 5 with respect to the assembled drive plates 7 and 8, the cuplike member is brought into position adjacent and opposite the drive plate 7 with the pin openings 10a in alignment with the reduced extensions 37 of the pins 11. This will bring the bearing openings 36 in the cuplike member in alignment with the journal elements 32 on the gears 16. The cuplike member 5 may then be put in place by moving it toward the drive plate 7, causing the journal extensions 32 to enter the bearing openings 36. In a similar manner the cuplike member 5a may be assembled by bringing it adjacent and opposite the drive plate 8 with the pin openings 10a in alignment with the pin extensions 38. The cuplike member 5a may then be moved toward the drive plate 8 to cause the pin extensions 38 and journal extensions 25 to enter the pin openings 10a and bearing openings 39, respectively.

For effecting rotation of the gear carrier and housing 1, a ring gear 40 is secured thereto. For this purpose the cuplike members 5 and 5a are provided with juxtaposed outwardly extending flanges 41 and 42, respectively (Fig. 1), and the ring gear is provided with an inwardly extending flange 43 juxtaposed with respect to the flange 42 on the cuplike member 5a. These flanges are provided with alignable bolt openings through which clamping bolts 44 may be inserted, the threaded end of each clamping bolt being screwed into the inwardly extending flange 43 on the ring gear.

The transmission may be used in any suitable situation; for example, as a differential transmission for driving two drive axles of an automotive vehicle.

When and as long as the axle gear 3, meshing with the planet gears 20, is allowed or caused to turn faster than the axle gear 2, meshing with the planet gears 16, the plate 7 will be clamped between the nut gear 18 and the collar 28, locking the entire differential as a unit until the gear 3 is prevented from turning faster than the gear 2.

When and as long as the axle gear 2 meshing with the planet gears 16 is allowed or caused to turn faster than the axle gear 3, meshing with the planet gears 20, the plate 8 will be clamped between the nut gear 18 and the screw gear 20, locking the entire differential as a unit until the gear 2 is prevented from turning faster than the gear 3.

When both ground wheels have tractive effect and the vehicle is travelling a straight course, power will be transmitted equally to both ground wheels. If the vehicle is going around a corner and one or the other of the ground-engaging wheels has to precess, the driving effort will be transmitted to the locked lagging wheel, the other wheel precessing as required because of its engagement with the ground.

In use, if one ground engaging wheel has traction and the other does not and power is being applied to turn the gear carrier 1, the threaded gears 18 will rotate slightly, due to the road resistance of the ground wheel which has traction until each of these internally threaded gears 18 has rotated sufficiently to cause it to clamp one or the other of the drive plates 7 or 8 against either the shouldered collar 28 or the shouldered gear 20 to lock the internally threaded gear 18, the gears 17 and 16, the threaded extension 19, and the gear 20 against further rotation with respect to the gear carrier 1. Further driving force of the gear carrier will be transmitted directly to the axle gear, 2 or 3, and the axle of that wheel which has traction through one or the other of the locked spur gears, 20 or 16, regardless of the fact that one of the ground-engaging wheels has no tractive effect.

When both ground wheels have tractive effect and the vehicle is travelling a straight course, power will be transmitted equally to both wheels. If the vehicle is going around a corner and one or the other of the ground-engaging wheels has to advance faster than the other, the driving effort will be transmitted to the locked lagging wheel, the other wheel advancing as required because of its engagement with the ground.

I claim:

1. A non-torque-equalizing transmission comprising a firmly united rotatable combined gear carrier and housing, a pair of gears rotatably mounted in said housing and housed thereby and coaxial therewith, and a non-torque-equalizing transmission between said gears mounted in said housing and housed thereby, said housing comprising two cup-shaped members mounted face to face to form an outer housing, each cup-shaped member having a central opening for an element rotatable with one of said pair of gears, said gear carrier comprising a pair of bearing and drive members firmly united with said cup-shaped housing members, respectively, and having bearing means for said pair of gears, respectively, each cup-shaped member having annularly located face means for engagement with annularly located face means on a drive member, said pair of cup-shaped members and pair of drive members having annularly located openings in alignment with each other and having positioning pins extending into said aligned openings, said pins having shoulder portions lying between said drive members for engagement therewith, said non-torque-equalizing transmission comprising a plurality of sets of planet gears, each set comprising a double gear element, one gear of one double gear element meshing with one of said coaxial gears and the other meshing with one of the gears of the other double gear element, the other gear of the other double gear element meshing with the other coaxial gear, said cup-shaped members and drive members having aligned bearings therein in which said planet gears are mounted.

2. A non-torque-equalizing transmission comprising a rotatable gear carrier, a pair of gears rotatably mounted on said gear carrier and coaxial therewith, and a non-torque-equalizing transmission between said gears mounted on said gear carrier comprising a pair of bearing and drive members having bearing means for said pair of gears, respectively, said non-torque-equalizing transmission comprising two double planet gears, one gear of each double gear meshing with a gear of the other double gear, and lying between said drive members, said double gears having their axes parallel to the axis of said gear carrier, said gear carrier having bearings therein in which said planet gears are mounted, the gears of one of said double gear elements being spaced apart and firmly united by a reduced neck portion, one of said drive members having a radially extending outwardly opening recess for receiving said reduced neck portion.

OTTO R. SCHOENROCK.

References Cited in the file of this patent

UNITED STATES PATENTS

| Number | Name | Date |
|---|---|---|
| 827,095 | Gray | July 31, 1906 |
| 843,687 | Morrison | Feb. 12, 1907 |
| 1,108,800 | Shrader | Aug. 25, 1914 |
| 1,409,535 | Elbertz | Mar. 14, 1922 |
| 2,090,130 | Kittel | Aug. 17, 1937 |
| 2,481,873 | Randall | Sept. 13, 1949 |

FOREIGN PATENTS

| Number | Country | Date |
|---|---|---|
| 418,582 | Great Britain | Apr. 19, 1934 |
| 507,534 | Great Britain | June 16, 1939 |
| 383,235 | France | Feb. 27, 1908 |